(12) United States Patent
Yan et al.

(10) Patent No.: US 9,106,449 B2
(45) Date of Patent: Aug. 11, 2015

(54) METHOD, APPARATUS AND SYSTEM FOR OBTAINING LOGON INFORMATION

(75) Inventors: Min Yan, Shenzhen (CN); Caishi Yang, Shenzhen (CN); Haochong Peng, Shenzhen (CN); Liang Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 998 days.

(21) Appl. No.: 12/647,922

(22) Filed: Dec. 28, 2009

(65) Prior Publication Data

US 2010/0100633 A1 Apr. 22, 2010

Related U.S. Application Data

(63) Continuation of application No. PCT/CN2008/070526, filed on Mar. 18, 2008.

(30) Foreign Application Priority Data

Jul. 13, 2007 (CN) .......................... 2007 1 0128095

(51) Int. Cl.
*H04L 12/58* (2006.01)
*H04L 29/06* (2006.01)

(52) U.S. Cl.
CPC .............. *H04L 12/581* (2013.01); *H04L 51/04* (2013.01); *H04L 63/083* (2013.01); *H04L 63/18* (2013.01)

(58) Field of Classification Search
CPC ...... H04L 12/581; H04L 51/04; H04L 63/083

USPC .......................................................... 709/229
See application file for complete search history.

(56) References Cited

U.S. PATENT DOCUMENTS

| | | | | |
|---|---|---|---|---|
| 6,699,125 | B2 * | 3/2004 | Kirmse et al. ................... | 463/42 |
| 7,500,262 | B1 * | 3/2009 | Sanin et al. ........................ | 726/2 |
| 7,640,348 | B2 * | 12/2009 | Atwal et al. ................... | 709/229 |
| 7,711,832 | B1 * | 5/2010 | Champion et al. ............ | 709/228 |
| 2004/0098733 | A1 * | 5/2004 | Bjare et al. ..................... | 719/328 |
| 2006/0036682 | A1 * | 2/2006 | Fletcher et al. ................ | 709/203 |
| 2008/0060066 | A1 * | 3/2008 | Wynn et al. ....................... | 726/6 |

(Continued)

FOREIGN PATENT DOCUMENTS

| | | |
|---|---|---|
| CN | 1794248 A | 6/2006 |
| CN | 1937662 A | 3/2007 |

(Continued)

OTHER PUBLICATIONS

International Search Report for International Patent Application No. PCT/CN2008/070526 (English Translation).*

(Continued)

*Primary Examiner* — Bryan Lee
(74) *Attorney, Agent, or Firm* — Harness, Dickey & Pierce, P.L.C.

(57) ABSTRACT

A method and system for obtaining logon information are provided, and the method includes: receiving a request for logon information from a value-added service client; sending the request for the logon information to an Instant Messaging (IM) client corresponding to the value-added service client; receiving the logon information from the IM client; and sending the logon information to the value-added service client.

14 Claims, 3 Drawing Sheets

(56) References Cited

U.S. PATENT DOCUMENTS

| | | | |
|---|---|---|---|
| 2009/0077664 A1* | 3/2009 | Hsu et al. | 726/24 |
| 2009/0187835 A1* | 7/2009 | Wu et al. | 715/758 |
| 2010/0036813 A1* | 2/2010 | Cameron et al. | 707/3 |
| 2011/0166885 A1* | 7/2011 | Walker et al. | 705/3 |

FOREIGN PATENT DOCUMENTS

| | | |
|---|---|---|
| CN | 1992612 A | 7/2007 |
| CN | 101119335 A | 2/2008 |
| WO | 2009009968 A1 | 1/2009 |

OTHER PUBLICATIONS

International Search Report for International Patent Application No. PCT/CN2008/070526, dated Jun. 26, 2008, and English translation thereof.

Vietnam Office Action for Application No. 1-2009-02692 dated Jun. 24, 2011 and English translation thereof.

* cited by examiner

METHOD, APPARATUS AND SYSTEM FOR OBTAINING LOGON INFORMATION

CROSS-REFERENCE TO RELATED APPLICATIONS

This application is a continuation of International Application No. PCT/CN2008/070526, filed Mar. 18, 2008. This application claims the benefit and priority of Chinese Application No. 200710128095.5, filed Jul. 13, 2007. The entire disclosures of each of the above applications are incorporated herein by reference.

FIELD

The present disclosure relates to logon technology in Instant Messaging, and particularly, to a method, apparatus and system for obtaining logon information.

BACKGROUND

This section provides background information related to the present disclosure which is not necessarily prior art.

In existing Internet applications, along with fast development of Instant Messaging (IM), various applications and services based on the IM are popularized and used more and more widely, e.g. a value-added service such as an online game. When the value-added service such as the online game is used, a client used by a user can directly log on a server of the value-added service by using an IM account and can enjoy the relevant value-added service after passing authentication of the server of the value-added service.

By taking an online game as an example, while installing IM software, the user usually installs IM game software corresponding to the IM software at the same time. After the user logs on the IM software, if the user needs to join a certain IM game, the user may start a client of the IM game through clicking a button corresponding to the IM game so as to join the IM game. In other words, after logging on the IM software, the client of the IM game need not provide logon information of a game server but can log on the game server directly.

FIG. 1 illustrates a conventional procedure of a game client logging on a game server. The conventional procedure relates to communication and interaction between four entities including an IM client 11, a game client 12, a game authentication server 20 and an IM authentication server 30. As shown in FIG. 1, the conventional procedure of the game client logging on the game server includes the following steps.

Step 101: The game client 12, which is started, requests the IM client 11 for logon information by way of inter-process communication. The logon information may be information such as a user account.

Step 102: After receiving the request from the game client 12, the IM client 11 returns the logon information of a user to the game client 12 by way of the inter-process communication.

Because the user has logged on the IM software before starting the game client 12, i.e. has started the IM client 11 of the user, and the IM client 11 has obtained the logon information of the user. In this step, the IM client 11 returns the logon information of the user to the game client 12 which initiates the request.

Step 103: After obtaining the logon information of the user, the game client 12 reports the logon information to the game authentication server 20 by way of network communication.

Step 104: The game authentication server 20 sends authentication information to the IM authentication server 30 by way of the network communication.

Herein, the authentication information includes, but is not limited to, a user account, a password, a key, gender, age, a certificate number, an address and a true name.

Step 105: After authenticating the user, the IM authentication server 30 returns an authentication result to the game authentication server 20 by way of the network communication. Herein, the authentication result may be authentication-pass or authentication-failure.

Step 106: The game authentication server 20 returns the authentication result to the game client 12.

Step 107: In the case of the authentication-pass, the game client 12 is allowed to log on the game server and to start a corresponding game.

As can be seen from the above procedure, the game client obtains the logon information such as the user account from the IM client by way of the inter-process communication. In other words, a communication mode between the IM client and the game client is pre-configured, and the IM client cannot add or change the communication process at any moment according to the update of the game client. If a new game client is issued, the new game client can not communicate with the IM client because no communication process is created between the new game client and the IM client. The new game client can not log on the game server until a communication process is created between the new game client and the IM client, for example, until the version of the IM client is upgraded.

SUMMARY

This section provides a general summary of the disclosure, and is not a comprehensive disclosure of its full scope or all of its features.

An embodiment of the present invention provides a method, system and apparatus for obtaining logon information, which can easily and conveniently realize communication and interaction between a new client and an IM client.

According to an embodiment, a method for obtaining logon information includes:

receiving, by a function plug-in, a request for logon information from a value-added service client;

sending, by a function plug-in, the request for the logon information to an Instant Messaging (IM) client corresponding to the value-added service client;

receiving, by a function plug-in, the logon information from the IM client; and sending, by a function plug-in, the logon information to the value-added service client.

According to another embodiment, an apparatus for obtaining logon information includes:

a first module, adapted to receive a request for logon information from a value-added service client corresponding to the apparatus;

a second module, adapted to send the request for the logon information to an Instant Messaging (IM) client corresponding to the value-added service client;

a third module, adapted to receive the logon information from the IM client; and a fourth module, adapted to send the logon information to the value-added service client.

According to another embodiment, a system for obtaining logon information includes:

a value-added service client, adapted to send a request for logon information, and receive the logon information from a function plug-in;

the function plug-in, adapted to receive the request for the logon information from the value-added service client corresponding to the function plug-in, and send the request for the logon information to an Instant Messaging (IM) client corresponding to the value-added service client; receive the logon information from the IM client; send the logon information to the value-added service client;

the IM client, adapted to receive the request for the logon information from the function plug-in, and send the logon information to the function plug-in.

In the embodiment of the present invention, the function plug-in corresponding to the value-added service client is configured and the function plug-in can communicate with the IM client by using the common interface. Therefore, the value-added service client can obtain the logon information from the IM client through the function plug-in so as to log on the value-added service server.

Through embodiments of the present invention, when a new value-added service client is issued, it is just needed to add a new function plug-in corresponding to the new value-added service client and register the new function plug-in while installing the new value-added service, while it is not necessary to make any change to the existing IM client. Therefore, the new value-added service client can interact with the IM client through the new function plug-in, and then obtain the logon information. The new plug-in interacts with the IM client by using the common interface, thereby enabling the new value-added service client to obtain the logon information easily, flexibly and conveniently and then log on the value-added service server.

In addition, on one hand, different function plug-ins may be respectively added according to different value-added service clients and different function requirements in the embodiments of the present invention. Therefore, the communication and interaction between the IM client and any game client can be implemented and the expansibility of the IM client is improved. On the other hand, the function plug-in in the embodiments of the present invention adopts the uniform common interface to communicate and interact with the IM client, and therefore, as long as the IM client is capable of providing the common interface for the function plug-in, the function plug-in can interact with various different IM clients, such as American IM (AIM). Even if the function plug-in or the game client is upgraded or updated, the AIM client need not be changed either. When a new value-added service client is added, it is just needed to add a new function plug-in. Therefore, the adaptability of the value-added service client is improved and the popularization of the value-added service client is accelerated.

In addition, in the case of interacting with the IM client bearing different IM systems, as long as a current user has account information of a currently-used IM system, the current user can interact with the currently-used IM client through the function plug-in, obtain current account information of the user, and then log on game clients of other IM systems by using the current account information to play a game. Therefore, the process of applying for an account and inputting a game account password is avoided, thus lowering the complexity of the procedure, simplifying the procedure and facilitating operations of the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
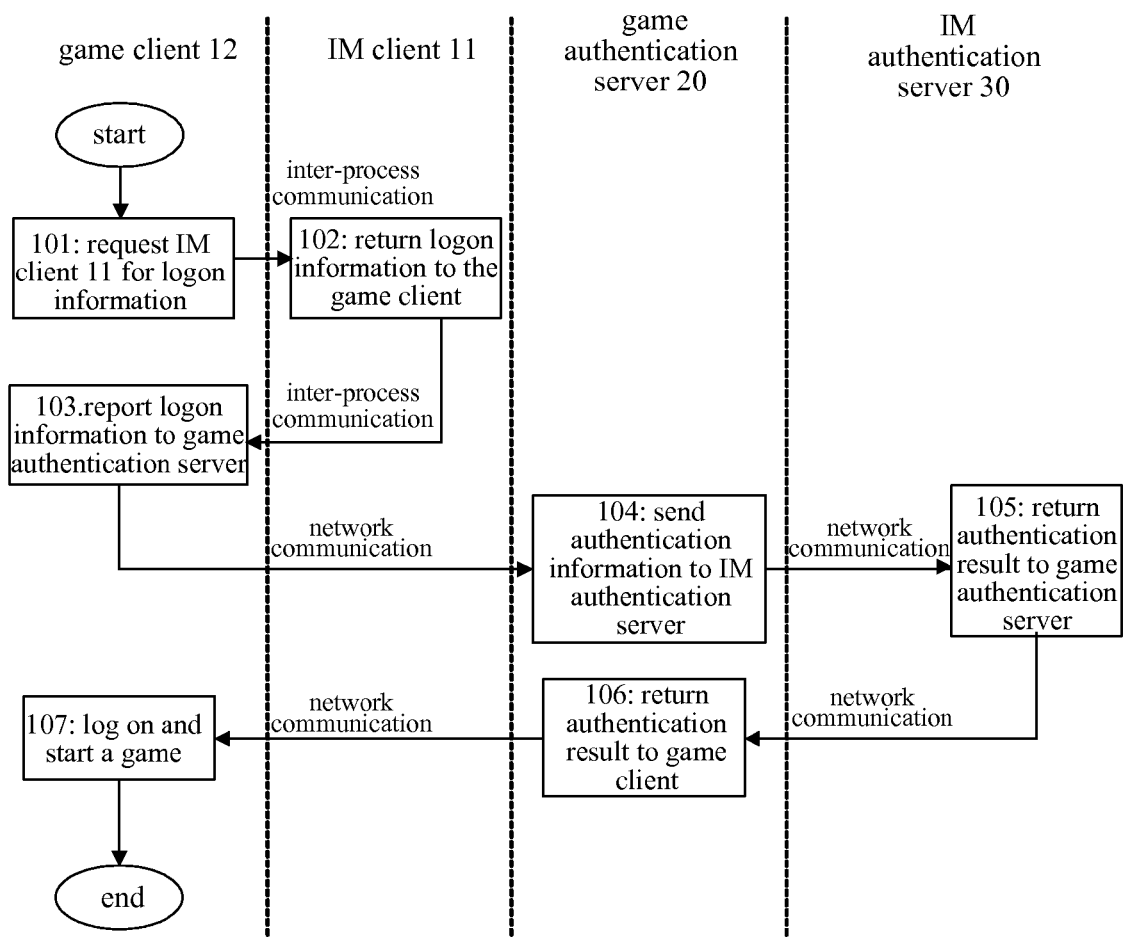
FIG. 1 is a schematic diagram illustrating a conventional procedure of a game client logging on a game server.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In an embodiment of the present invention, a function plug-in corresponding to a value-added service client is configured. The function plug-in can adopt a common interface to communicate with an IM client, which thereby enables the value-added service client to obtain logon information from the IM client through the function plug-in and then log on a game server.

In an embodiment of the present invention, the function plug-in is a set including at least one function program, may be configured according to function requirements of a corresponding game client and invoke the common interface according to requirements. Further, communication and interaction between the function plug-in and the IM client adopt a uniform common interface.

As a simple example, the IM client configures one common interface as follows:

```
interface IAccImSession
{
    HRESULT SendIm( name, content);
}
```

The above common interface is used to send a piece of IM information to a user. When the function plug-in needs to invoke the above common interface, it is only required to execute corresponding pseudo-codes, e.g.

```
void PluginSendIm(name, content)
{
        IAccImSession pIm = GetIAccImSession( );
    pIm->SendIm(name, content);
}
```

Through the above pseudo-codes, the function plug-in can obtain an IAccImSession interface pointer provided by an IM client and send a piece of IM information (content) to a user (name).

By analogy, the IM client can define a variety of common interfaces according to practical requirements, and the function plug-in only needs to invoke a corresponding common interface in a similar manner when it is necessary.

As can be seen from the above example, as long as the IM client used currently by the user can provide a uniform common interface, the function plug-in can communicate and interact with the IM client by using the common interface. Correspondingly, if a value-added service client is added or updated, it is only necessary to configure a function plug-in corresponding to the added or updated value-added service according to function requirements. While the added or updated value-added service is loaded, the corresponding function plug-in is also loaded simultaneously. Thus, the new value-added service client or the updated value-added service client can establish the communication interaction with the IM client through the function plug-in, and thereby can obtain the logon information, log on the value-added service server and proceed to subsequent processing.

Hereinafter, an embodiment of the present invention is described by taking a game as an example of the value-added service.

Figure 2:
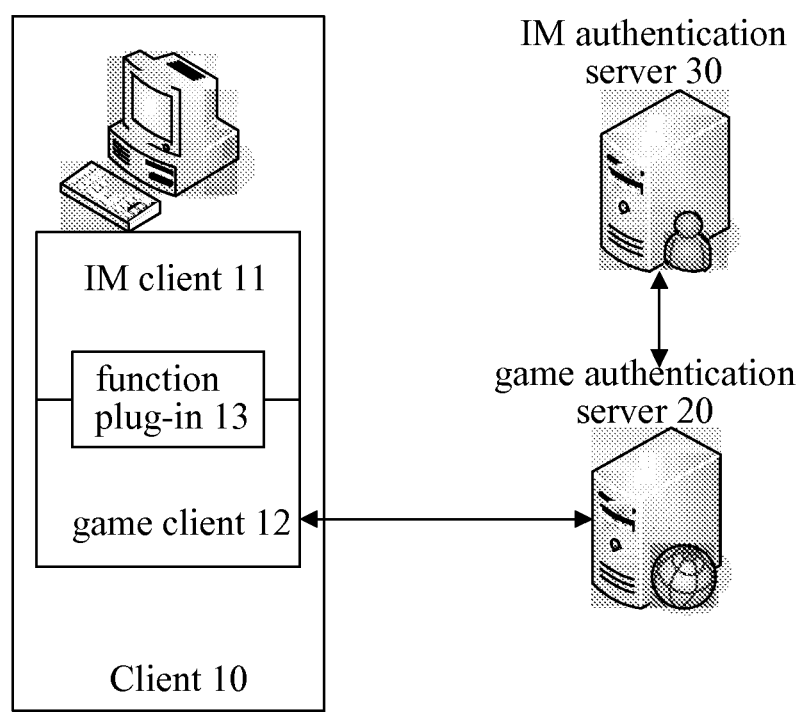
FIG. 2 is a schematic diagram illustrating a structure of a system for logging on a value-added service server according to an embodiment of the present invention.

FIG. 2 is illustrates a structure of a system for logging on a game server according to an embodiment of the present invention. As shown in FIG. 2, the system includes a client 10 and a server side. The client 10 includes an IM client 11, a game client 12 and a function plug-in 13. The server side includes a game authentication server 20 and an IM authentication server 30.

The IM client 11 is adapted to make a user logon by using an IM account and automatically load a registered IM plug-in of a system. The game client 12 is adapted to communicate with the game authentication server 20, and report logon information of the user, such as account information of the user, to the game authentication server 20. The game authentication server 20 is adapted to send authentication information corresponding to the logon information of the user reported by the game client 12 to the IM authentication server 30. The IM authentication server 30 is adapted to authenticate whether the authentication information sent by the game authentication server 20 corresponds to a valid user, for example, whether the authentication information corresponds to a valid IM account. The function plug-in 13 is adapted to obtain the logon information of the user from the IM client 11, and perform inter-process communication with the game client 12 to send the logon information of the user to the game client 12. When the IM client 11 corresponds to multiple game clients including the game client 12 simultaneously, the registered IM plug-in of the IM client 11 may be the function plug-in 13 corresponding to the game client 12, or function plug-ins corresponding to the other game clients.

In practical applications, the function plug-in 13 may be an independent entity or a function module configured inside the game client 12 or the IM client 11.

Figure 3:
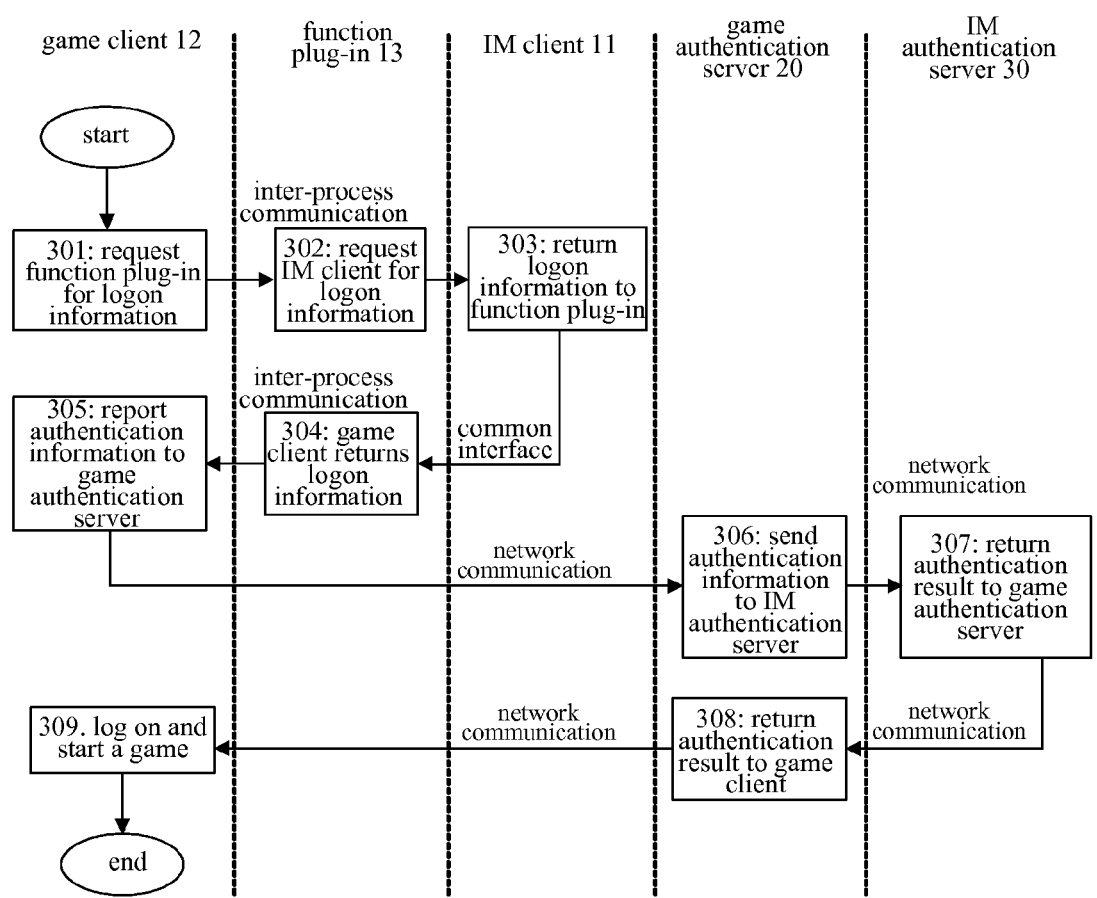
FIG. 3 is a schematic diagram illustrating a procedure of logging on a value-added service server according to an embodiment of the present invention.

Based on the system shown in FIG. 2, a procedure of logging on a game server according to an embodiment of the present invention is illustrated in FIG. 3, and includes the following steps.

Step 301: The game client 12, which is started, requests the function plug-in 13 for logon information of a current user by way of inter-process communication. The logon information may be information such as a user account.

Step 302: After receiving the request from the game client 12, the function plug-in 13 requests the IM client 11 for the logon information of the current user by invoking a common interface.

Step 303: After receiving the request from the function plug-in 13, the IM client 11 returns the logon information of the current user to the function plug-in 13 through the common interface.

Because the user has logged on IM software before starting the game client 12, i.e. the user has started the IM client 11, the IM client 11 has obtained the logon information of the user. In this step, the IM client 11 returns the logon information of the user to the function plug-in 13 which initiates the request.

Step 304: After receiving the logon information of the user, the function plug-in 13 returns the logon information of the user to the game client 12 by way of inter-process communication.

Step 305: After obtaining the logon information of the user, the game client 12 reports the logon information to the game authentication server 20 by way of network communication.

Step 306: The game authentication server 20 sends authentication information to the IM authentication server 30 by way of the network communication.

Herein, the authentication information is information for authenticating whether a user is valid and includes, but is not limited to, a user account, a password, a key, gender, age, a certificate number, an Email address, a correspondence address and a true name.

Step 307: After authenticating the user, the IM authentication server 30 returns an authentication result to the game authentication server 20 by way of the network communication. The authentication result may be authentication-pass or authentication-failure.

Step 308: The game authentication server 20 returns the authentication result to the game client 12.

Step 309: In the case of authentication-pass, the game client 12 is allowed to log on the game server and start a corresponding game. In the case of authentication-failure, a prompt that game server logon fails is provided, and a prompt for logging again may also be provided.

As can be seen, with respect to the IM client capable of providing a uniform common interface, the function plug-in of the embodiments of the present invention can communicate and interact with it by invoking the common interface and thereby obtain the logon information. When a new value-added service client is issued, it is just needed to add a new function plug-in corresponding to the new value-added service client and register the new function plug-in while installing the new value-added service, while it is not necessary to make any change to the existing IM client. Therefore, the method and system for obtaining the logon information are applicable to various different instant messaging systems, such as AIM and Tencent QQ.

The foregoing is only embodiments of the present invention. The protection scope of the present invention, however, is not limited to the above description. Any change or substitution, easily occurring to those skilled in the art, should be covered by the protection scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for obtaining logon information, comprising:
    obtaining, by an Instant Messaging (IM) client of a user, logon information which comprises a user account of the user when the user logs on the IM client;
    sending, by a value-added service client of the user, a request for logon information when the user started the value-added service client;
    receiving, by a function plug-in, the request for logon information from the value-added service client;
    sending, by the function plug-in, the request for the logon information to the IM client;
    returning, by the IM client, the logon information of the user to the function plug-in;
    receiving, by the function plug-in, the logon information from the IM client;
    sending, by the function plug-in, the logon information to the value-added service client; and
    sending, by the value-added service client, the logon information of the user obtained from the IM client to a value-added service server to log on the value-added service server.

2. The method of claim 1, wherein the request for the logon information is sent to the IM client through a common interface invoked, and the logon information is received from the IM client through the common interface invoked.

3. The method of claim 2, wherein the common interface is configured by the IM client.

4. The method of claim 2, wherein the request for the logon information is received from the value-added service client by way of inter-process communication, and the logon information is sent to the value-added service client by way of the inter-process communication.

5. The method of claim 1, wherein the request for the logon information is received from the value-added service client by way of inter-process communication, and the logon information is sent to the value-added service client by way of the inter-process communication.

6. The method of claim 1, further comprising:
    loading the function plug-in before receiving the request for the logon information from the value-added service client.

7. A system for obtaining logon information, comprising:
    a value-added service client, adapted to send a request for logon information when a user starts the value-added service client, receive the logon information which comprises a user account of the user from a function plug-in, and send the logon information of the user to a value-added service server to log on the value-added service server;
    the function plug-in, adapted to receive the request for the logon information from the value-added service client, and send the request for the logon information to an Instant Messaging (IM) client; receive the logon information from the IM client; send the logon information to the value-added service client;
    the IM client, adapted to obtain logon information of the user when the user logs on the IM client, receive the request for the logon information from the function plug-in, and send the logon information to the function plug-in.

8. The system of claim 7, wherein the function plug-in and the value-added service client corresponding to the function plug-in are loaded in the system simultaneously.

9. The system of claim 8, wherein the function plug-in interacts with the IM client through a common interface invoked.

10. The system of claim 8, wherein the function plug-in interacts with the value-added service client by way of inter-process communication.

11. The system of claim 7, wherein the function plug-in interacts with the IM client through a common interface invoked.

12. The system of claim 11, wherein the common interface is configured by the IM client.

13. The system of claim 7, wherein the function plug-in interacts with the value-added service client by way of inter-process communication.

14. The system of claim 7, wherein the function plug-in is an independent entity, or is located in the value-added service client or the IM client.

* * * * *